(12) United States Patent
Perevozchikov et al.

(10) Patent No.: US 10,818,940 B2
(45) Date of Patent: *Oct. 27, 2020

(54) HEAT REJECTION SYSTEM FOR ELECTROCHEMICAL CLIMATE CONTROL SYSTEM

(71) Applicant: Emerson Climate Technologies, Inc., Sidney, OH (US)

(72) Inventors: Michael M. Perevozchikov, Tipp City, OH (US); Kirill M. Ignatiev, Sidney, OH (US)

(73) Assignee: Emerson Climate Technologies, Inc., Sidney, OH (US)

(*) Notice: Subject to any disclaimer, the term of this patent is extended or adjusted under 35 U.S.C. 154(b) by 23 days.

This patent is subject to a terminal disclaimer.

(21) Appl. No.: 16/278,354

(22) Filed: Feb. 18, 2019

(65) Prior Publication Data

US 2019/0260043 A1    Aug. 22, 2019

Related U.S. Application Data

(63) Continuation of application No. 15/899,024, filed on Feb. 19, 2018, now Pat. No. 10,211,469.

(51) Int. Cl.
*H01M 8/04029* (2016.01)
*F25B 30/02* (2006.01)
(Continued)

(52) U.S. Cl.
CPC .......... *H01M 8/04029* (2013.01); *F25B 1/00* (2013.01); *F25B 13/00* (2013.01); *F25B 30/02* (2013.01);
(Continued)

(58) Field of Classification Search
CPC .......... F24H 4/04; F24H 9/2021; F25B 30/02; F25B 2339/047; F25B 13/00; F25B 15/09
See application file for complete search history.

(56) References Cited

U.S. PATENT DOCUMENTS

| 9,574,796 B2 | 2/2017 | Kempiak |
| 10,211,469 B1* | 2/2019 | Perevozchikov ......... F25B 1/00 |

(Continued)

FOREIGN PATENT DOCUMENTS

| WO | 2015034418 A1 | 3/2015 |
| WO | 2019161373 A1 | 8/2019 |

OTHER PUBLICATIONS

James, N.A. et al. "Thermodynamic Analysis of an Electrochemically Driven Chemically Looping Heat Pump." 16th International Refrigeration and Air Conditioning Conference at Purdue, Jul. 11-14, 2016. pp. 1-11.

(Continued)

*Primary Examiner* — Elizabeth J Martin
(74) *Attorney, Agent, or Firm* — Harness, Dickey & Pierce, P.L.C.

(57) ABSTRACT

A climate control system includes an electrochemical device in fluid communication with at least one fluid conduit that also includes a first heat exchanger, an expansion device, and a pump, but may be free of any condensers. A working fluid is circulated in the fluid conduit that has a composition that undergoes a reversible hydrogenation and dehydrogenation reaction when it passes through the electrochemical device when a potential is applied thereto. The climate control system includes a heat rejection system in the form of a recirculation loop having a second heat exchanger configured to cool a portion of the working fluid exiting the electrochemical device and a recirculation pump that circulates the portion of the working fluid exiting the electrochemical device through the second heat exchanger and back to an inlet of the electrochemical device. Methods for rejecting heat from an electrochemical climate control system are also provided.

14 Claims, 6 Drawing Sheets

(51) Int. Cl.
  *F25B 13/00* (2006.01)
  *F25B 1/00* (2006.01)
  *H01M 8/18* (2006.01)
  *C09K 5/16* (2006.01)
  *F25B 15/09* (2006.01)
(52) U.S. Cl.
  CPC ............. *H01M 8/18* (2013.01); *C09K 5/16* (2013.01); *F25B 15/09* (2013.01)

(56) References Cited

U.S. PATENT DOCUMENTS

2014/0290295 A1    10/2014  Bahar
2017/0362720 A1*   12/2017  Bahar ................ B01D 71/14

OTHER PUBLICATIONS

Tao, Ye, et al. "Electrochemical compressor driven metal hydride heat pump." international journal of refrigeration 60 (2015): 278-288.
Radermacher, R. et al. "Outlook on the future—refrigeration, heating, ventilation and air conditioning technologies." Institute on Refrigeration. pp. 2-11. Oct. 2015.
International Search Report and Written Opinion for International Application No. PCT/US2019/018537 dated May 28, 2019 (ISA/KR), 9 pages.

* cited by examiner

-- Prior Art --

-- Prior Art --

-- Prior Art --

-- Prior Art --

HEAT REJECTION SYSTEM FOR ELECTROCHEMICAL CLIMATE CONTROL SYSTEM

CROSS-REFERENCE TO RELATED APPLICATIONS

This application is a continuation of U.S. patent application Ser. No. 15/899,024 filed on Feb. 19, 2018. The entire disclosure of the above application is incorporated herein by reference.

FIELD

The present disclosure relates to climate control systems including an electrochemical device that may have a heat rejection recirculation system, as well as methods for rejecting heat from an electrochemical climate control system.

BACKGROUND

This section provides background information related to the present disclosure which is not necessarily prior art.

A conventional thermodynamic climate control system such as, for example, a heat-pump system, a refrigeration system, or an air conditioning system, may include a fluid circuit having a first heat exchanger (e.g., a condenser that facilitates a phase change of refrigerant from gas/vapor phase to a liquid) that is typically located outdoors, a second heat exchanger (e.g., evaporator that facilitates a phase change of refrigerant from liquid to gas/vapor phase) that is typically located indoors or within the environment to be cooled, an expansion device disposed between the first and second heat exchangers, and a compressor that operates via a vapor compression cycle (VCC) to circulate and pressurize a gas/vapor phase refrigerant (and optional lubricant oil) between the first and second heat exchangers. The compressor is typically a mechanical compressor that serves to pressurize the refrigerant, which can be subsequently condensed and evaporated as it is circulated within the system so as to transfer heat into or out of the system.

In the United States, it is estimated that over 40% of primary energy consumption is attributed to buildings, including energy consumption for climate control (e.g., heating and cooling) in these buildings. Efficient and reliable operation of heating and cooling climate control systems can help to reduce energy consumption and potential greenhouse gas emissions associated with use and leakage of certain refrigerants. Climate control systems that use a mechanical compressor for vapor control compression have efficiencies that are dependent on performance of the compressor. When compared to theoretical efficiencies associated with Carnot heat pumping limits, there is still significant room for improvement in efficiency. Therefore, it would be desirable to develop a climate-control system capable of effectively and efficiently providing cooling and/or heating as required.

SUMMARY

This section provides a general summary of the disclosure, and is not a comprehensive disclosure of its full scope or all of its features.

In certain aspects, the present disclosure provides a climate control system comprising an electrochemical device. A first heat exchanger is configured to operate as an evaporator and disposed upstream of the electrochemical device. An expansion device disposed between the electrochemical device and the first heat exchanger. A first pump is provided, along with a fluid conduit for establishing fluid communication between the electrochemical device, the first heat exchanger, the expansion device, and the first pump, so that the first pump circulates a working fluid in the fluid conduit. The working fluid has a composition that undergoes a reversible hydrogenation and dehydrogenation reaction when it passes through the electrochemical device when a potential is applied thereto. A heat rejection system is configured to cool a portion of the working fluid exiting the electrochemical device for heat rejection from the electrochemical device. The heat rejection system may include a second heat exchanger configured to cool a portion of the working fluid exiting the electrochemical device for heat rejection from the electrochemical device. The heat rejection system may also include a recirculation pump that circulates the portion of the working fluid exiting the electrochemical device through the second heat exchanger and back to an inlet of the electrochemical device.

In one aspect, the electrochemical device comprises a positive electrode, a negative electrode, a separator, and a first outlet. The inlet is a first inlet and the electrochemical device further comprises a second inlet. The working fluid exits the expansion device in a gas or vapor phase and enters the positive electrode in the electrochemical device via the second inlet. The portion of the working fluid cooled in the heat rejection system is in a liquid phase and enters the positive electrode in the electrochemical device via the first inlet.

In one aspect, a temperature of the working fluid is reduced by greater than or equal to about 5° C. after exiting the heat rejection system as compared to an inlet temperature into the heat rejection system.

In one further aspect, the heat rejection system comprises a second heat exchanger and a temperature of the working fluid is reduced by greater than or equal to about 5° C. after exiting the second heat exchanger as compared to an inlet temperature into the second heat exchanger.

In one aspect, a temperature of the working fluid is reduced by greater than or equal to about 18° C. after exiting the heat rejection system as compared to an inlet temperature into the heat rejection system.

In one further aspect, the heat rejection system comprises a second heat exchanger and a temperature of the working fluid is reduced by greater than or equal to about 18° C. after exiting the second heat exchanger as compared to an inlet temperature into the second heat exchanger.

In one aspect, a temperature of the working fluid entering the electrochemical device is maintained at a temperature of less than or equal to about 100° C.

In one aspect, a percentage of recirculation of the portion of the working fluid is greater than or equal to about 2% and less than or equal to about 90% by volume of a total volume of the working fluid entering the electrochemical device.

In one aspect, the heat rejection system comprises a second heat exchanger that is a radiator.

In one aspect, the composition comprises acetone in a dehydrogenated form and isopropanol in a hydrogenated form.

In certain other aspects, the present disclosure provides a climate control system that comprises a first fluid conduit for establishing fluid communication between a first electrochemical device, a first heat exchanger configured to operate as an evaporator and disposed upstream of the first electrochemical device, a first expansion device disposed between the first electrochemical device and the first heat exchanger, and a first pump. The first pump circulates a first working fluid in the first fluid conduit. The first working fluid comprises a first pair of compounds that undergoes a reversible hydrogenation and dehydrogenation reaction in the first electrochemical device when a potential is applied thereto. A first recirculation pump circulates a portion of the first working fluid exiting the first electrochemical device through a second heat exchanger and back to a first inlet of the first electrochemical device for heat rejection from the first electrochemical device. The climate control system also comprises a second fluid conduit for establishing fluid communication between a second electrochemical device, a third heat exchanger configured to operate as an evaporator and disposed upstream of the second electrochemical device, a second expansion device disposed between the second electrochemical device and the third heat exchanger, and a second pump. The second pump circulates a second working fluid in the second fluid conduit. The second working fluid comprises a second pair of compounds that undergoes a reversible hydrogenation and dehydrogenation reaction in the second electrochemical device when a potential is applied thereto. A second recirculation pump circulates the portion of the second working fluid exiting the second electrochemical device through a fourth heat exchanger and back to a second inlet of the second electrochemical device for heat rejection from the second electrochemical device.

In one aspect, the first electrochemical device comprises a first positive electrode, a first negative electrode, a first separator, and a first outlet, and a third inlet. The working fluid exiting the first expansion device in a gas or vapor phase enters the first positive electrode in the first electrochemical device via the third inlet and the portion of the working fluid cooled in the second heat exchanger is in a liquid phase and enters the first positive electrode in the first electrochemical device via the first inlet. The second electrochemical device comprises a second positive electrode, a second negative electrode, a second separator, a second outlet, and a fourth inlet. The working fluid exiting the second expansion device in a gas or vapor phase then enters the second positive electrode in the second electrochemical device via the fourth inlet and the portion of the working fluid cooled in the fourth heat exchanger is in a liquid phase and enters the second positive electrode in the second electrochemical device via the second inlet.

In one aspect, the first pair of compounds comprises a first hydrogenated compound comprising isopropanol and a second dehydrogenated compound comprising acetone and the second pair of compounds comprises a third hydrogenated compound comprising cyclohexanol and a fourth dehydrogenated compound comprising cyclohexanone.

In one aspect, the second heat exchanger and the fourth heat exchanger are radiators.

In one aspect, a percentage of recirculation of the portion of the first working fluid is greater than or equal to about 2% and less than or equal to about 90% by volume of a total volume of the first working fluid entering the first electrochemical device and a percentage of recirculation of the portion of the second working fluid is greater than or equal to about 2% and less than or equal to about 90% by volume of a total volume of the second working fluid entering the second electrochemical device.

In yet other aspects, the present disclosure provides a method for rejecting heat from an electrochemical climate control system. The method comprises circulating a working fluid in a fluid conduit comprising a pump for pumping the working fluid, a first heat exchanger configured to operate as an evaporator and disposed upstream of an electrochemical device, and an expansion device disposed between the electrochemical device and the first heat exchanger. The working fluid comprises a composition that undergoes a reversible hydrogenation and dehydrogenation reaction when it passes through the electrochemical device when a potential is applied thereto. A portion of the working fluid exiting the electrochemical device is circulated into a heat rejection system that cools a portion of the working fluid and rejects heat from the electrochemical device. In certain aspects, a temperature of the working fluid in the electrochemical device may be maintained at less than or equal to about 100° C. Further, in certain aspects, the heat rejection system may comprise a recirculation loop that comprises a second heat exchanger.

In one aspect, the working fluid comprises a pair of a first hydrogenated compound and a second dehydrogenated compound that undergoes a reversible hydrogenation and dehydrogenation reaction in the first electrochemical device when a potential is applied thereto.

In one aspect, the first hydrogenated compound comprises isopropanol and the second dehydrogenated compound comprises acetone.

In one aspect, the portion of the working fluid exiting the electrochemical device recirculates in the heat rejection system and back to an inlet of the electrochemical device.

In one further aspect, the heat rejection system comprises a second heat exchanger and the portion of the working fluid exiting the electrochemical device recirculates in the second heat exchanger and back to an inlet of the electrochemical device.

In one aspect, a temperature of the working fluid is reduced by greater than or equal to about 5° C. after exiting the heat rejection system as compared to an inlet temperature into the heat rejection system.

In one further aspect, the heat rejection system comprises a second heat exchanger and a temperature of the working fluid is reduced by greater than or equal to about 5° C. after exiting the second heat exchanger as compared to an inlet temperature into the second heat exchanger.

In one aspect, a temperature of the working fluid is reduced by greater than or equal to about 18° C. after exiting the heat rejection system as compared to an inlet temperature into the heat rejection system.

In one further aspect, the heat rejection system comprises a second heat exchanger and a temperature of the working fluid is reduced by greater than or equal to about 18° C. after exiting the second heat exchanger as compared to an inlet temperature into the second heat exchanger.

In one aspect, a percentage of recirculation of the portion of the working fluid is greater than or equal to about 2% and less than or equal to about 90% by volume of a total volume of the working fluid entering the heat rejection system.

In one further aspect, the heat rejection system comprises a second heat exchanger and a percentage of recirculation of the portion of the working fluid is greater than or equal to about 2% and less than or equal to about 90% by volume of a total volume of the working fluid entering the second heat exchanger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6:
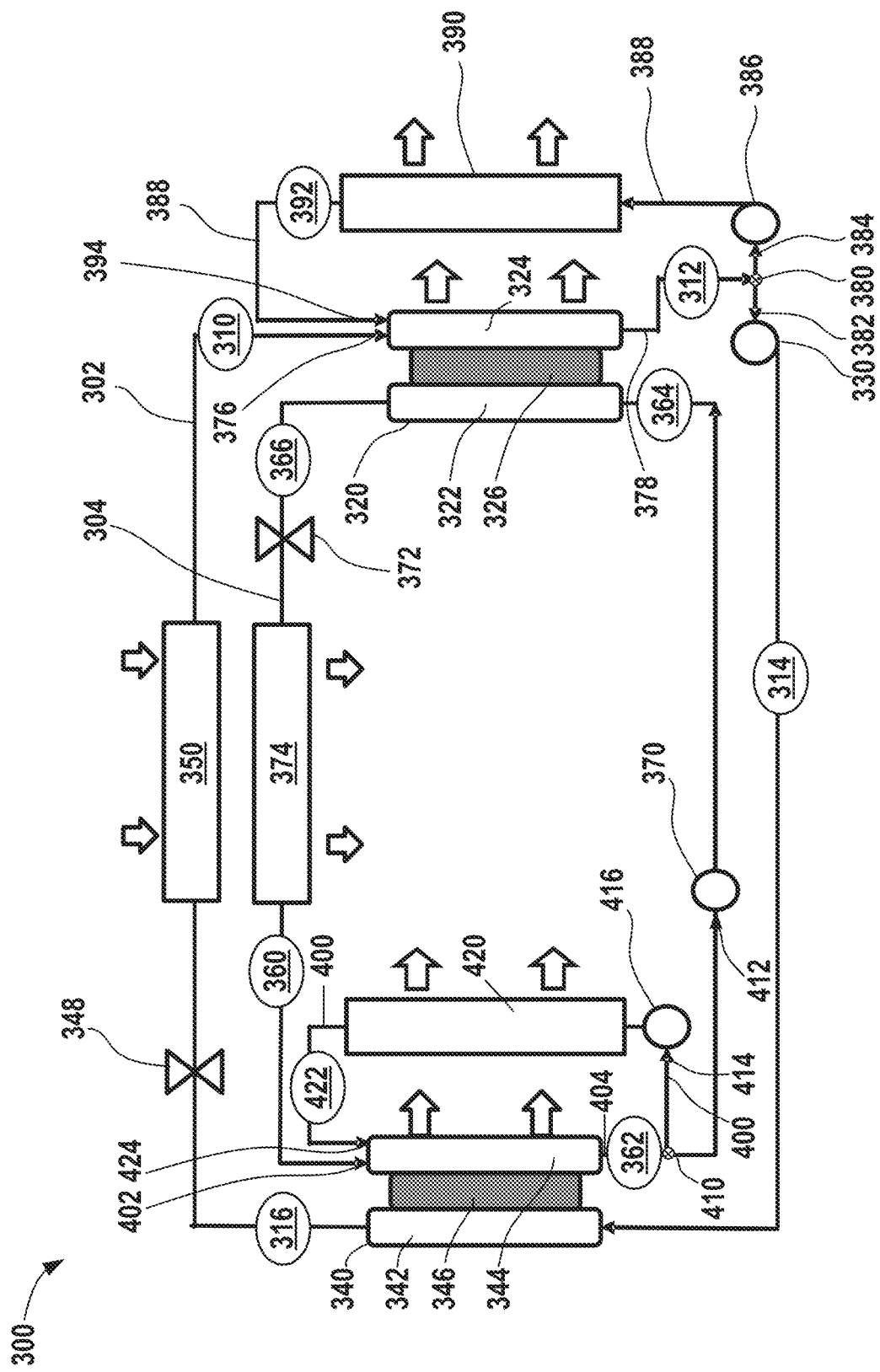

FIG. 6 shows yet another electrochemical climate control system prepared in accordance with certain aspects of the present disclosure incorporating two electrochemical devices and using two distinct working fluid pairs of hydrogenated and dehydrogenated compounds without any condenser in the system, but further having dual heat rejection systems associated with each of the two electrochemical devices.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of" the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
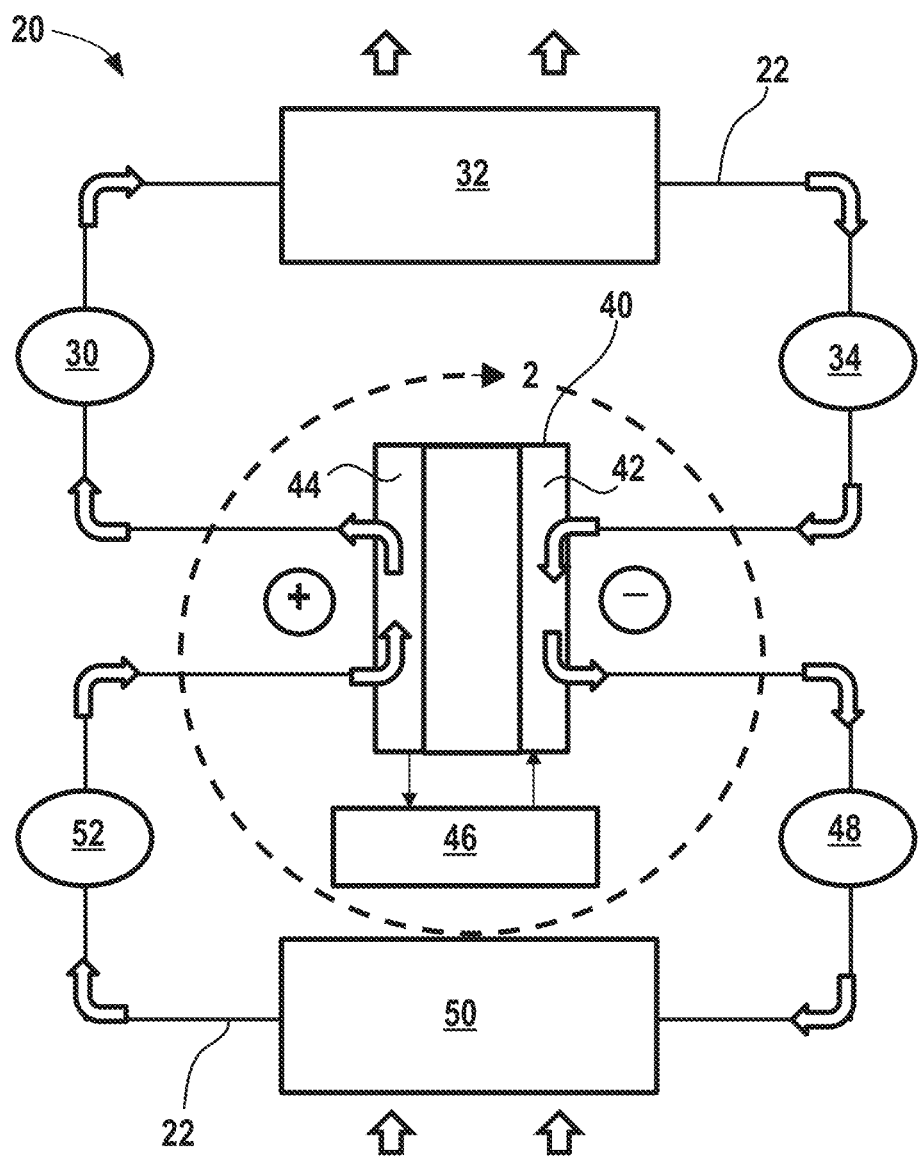
FIG. 1 shows a conventional electrochemical climate control system incorporating an electrochemical device having a single working fluid pair of hydrogenated and dehydrogenated compounds, along with a condenser and an evaporator.

FIG. 1 shows a schematic of an exemplary electrochemical climate control system 20 that processes and circulates a working fluid having a composition that is capable of undergoing a reversible hydrogenation and dehydrogenation reaction. The term "fluid" encompasses liquid, gas, and any combinations thereof, including vapor, as used herein. Chemical loops relying on hydrogenation/dehydrogenation of organic substances can be used for refrigeration cycles, for example. When a chemical composition of a substance changes, its physical properties can change in such a way that at a given pressure those fluids will transform phases (liquid to gas/vapor and back) at different temperatures. This principle allows for heat transfer and construction of a refrigeration or heat transfer system having a substantially constant internal pressure, but with two different chemical compositions achieving evaporation and condensation at different temperatures at the same pressure.

More specifically, a working fluid may be employed that is capable of reversible hydrogenation and dehydrogenation when it passes through the electrochemical device when an electrical potential or voltage is applied thereto. For example, a fluid composition may be reversibly converted by adding one or more hydrogen atoms and thus may be considered to be a fluid pair having a hydrogenated compound and a dehydrogenated compound. Generally, fluids for use in an electrochemical system may be selected so that at an evaporative pressure, a dehydrogenated compound exists in a gas/vapor form, while a hydrogenated compound is in a liquid form or vice versa.

Figure 2:
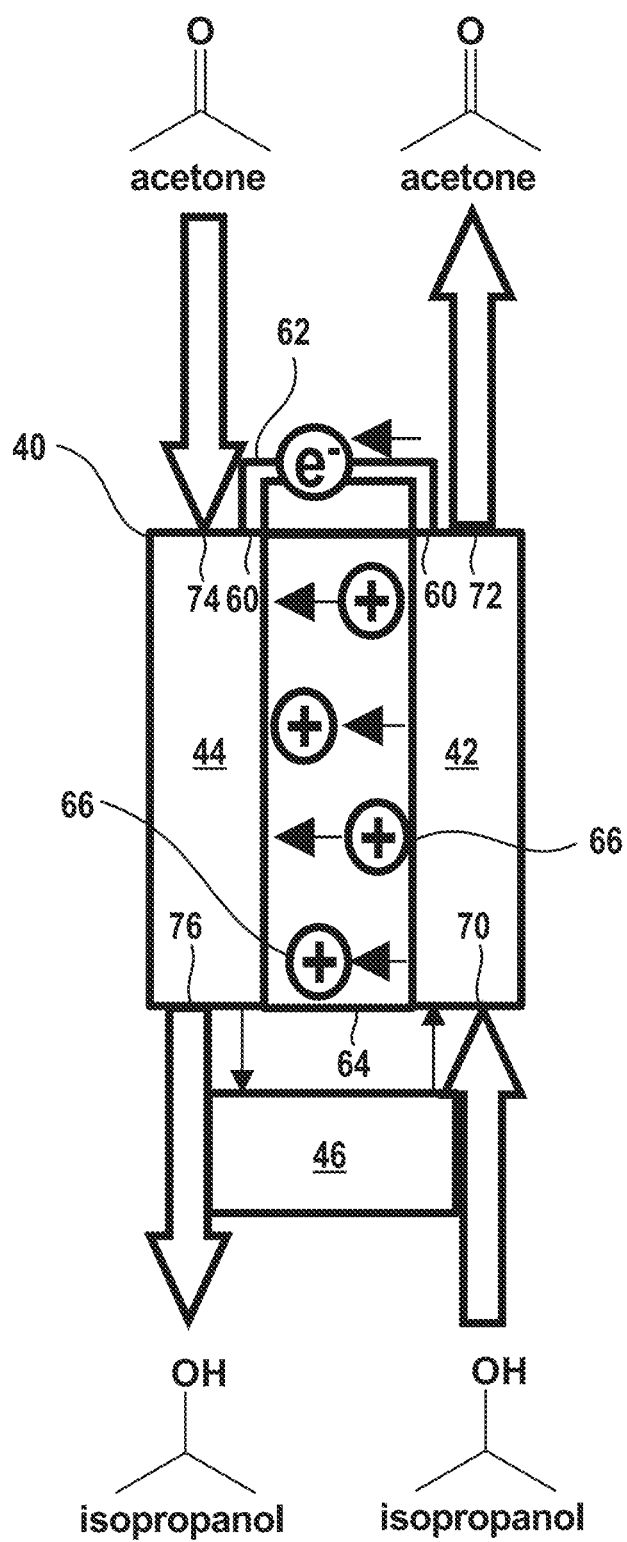
FIG. 2 shows a detailed view of the conventional electrochemical device in FIG. 1 with an exemplary working fluid having a pair of hydrogenated and dehydrogenated compounds of isopropanol and acetone.

By way of background, FIG. 1 shows a simplified schematic of a conventional electrochemical climate control system 20, such as a refrigeration system, using a single working fluid (having a single pair of a hydrogenated compound and a dehydrogenated compound). FIG. 2 is a detailed view of the electrochemical device in FIG. 1 using an exemplary working fluid pair of acetone and isopropanol. The acetone ($CH_3COCH_3$) is the dehydrogenated compound, while the isopropanol (($CH_3)_2CHOH$) is the hydrogenated compound. A difference in the boiling points between acetone and isopropanol is about 26° C. It should be noted that other fluid pairs may be selected that include a hydrogenated compound and a dehydrogenated compound with a difference in the boiling points of the chemical pair of greater than about 5° C., including by way of non-limiting example, cyclohexanone and cyclohexanol (difference in boiling points of about 6° C.), methanol and formaldehyde (difference in boiling points of about 84° C.), ethanol and acetaldehyde (difference in boiling points of about 57° C.), butanol and butanone (difference in boiling points of about 20° C.), 2-pentanol and 2-pentanone (difference in boiling points of about 17° C.), propylene glycol and hydroxyacetone (difference in boiling points of about 31° C.), 1,2-dimethylcyclohexane and o-xylene (difference in boiling points of about 118° C.), tetrahydrofuran and furan (difference in boiling points of about 34° C.), and cyclohexylamine and aniline (difference in boiling points of about 50° C.). Generally, a working fluid that undergoes a significant change in saturation temperature, for example, greater than or equal to about 5° C., optionally greater than or equal to about 15° C. in certain variations, after it undergoes transformation via hydrogenation or dehydrogenation reaction in the an electrochemical cell (as will be described below) is advantageous. For example, as noted above, boiling points or temperatures of evaporation are different for acetone and isopropanol and saturated vapor pressures for isopropanol and acetone are also different as a function of temperature.

With renewed reference to FIG. 1, the electrochemical climate control system 20 has a fluid flow path or fluid conduit 22 that establishes fluid communication between the various components, so that the working fluid may circulate in a loop as discussed further herein. At point 30 in the fluid conduit 22, the working fluid comprises isopropanol in a gas or vapor phase. The working fluid may then pass through a condenser 32, where it transforms from a gas/vapor phase to a liquid phase of isopropanol shown at point 34. In the condenser 32, the working fluid is cooled and expels heat from the electrochemical climate control system 20, as shown by the arrows. Next, the working fluid passes into an electrochemical device 40 having a negative electrode or anode 42 and a positive electrode or cathode 44, which will be described briefly herein and in further detail below in the context of FIG. 2. The liquid isopropanol thus enters the anode 42 side of the electrochemical device 40. During the electrochemical reaction driven by introduction of voltage/potential to the electrochemical device 40 from an external power source 46, such as a DC power supply, the isopropanol loses hydrogen (from the hydroxyl group) via a dehydrogenation reaction and transforms into a liquid phase of a dehydrogenated compound, acetone (having a carbonyl group). Thus, by applying voltage to the electrochemical device, the working fluid can be cycled between a hydrogenated compound and a dehydrogenated compound.

Thus, as the working fluid exits the anode 42 of the electrochemical device 40 it contains liquid acetone at point 48. The working fluid then passes into evaporator 50. The liquid acetone evaporates in the evaporator 50 to become a gas/vapor phase, because pressure is substantially uniform everywhere in the electrochemical climate control system 20. The temperatures of evaporation are different for acetone and isopropanol (e.g., saturated vapor pressures for isopropanol and acetone are different as a function of temperature). A difference in saturated temperature at the same pressure for the pair of substances allows the refrigeration system (electrochemical climate control system 20) to operate under substantially uniform pressure. During the evaporation process, heat is transferred into the electrochemical climate control system 20 so that heat is absorbed from the environment surrounding the evaporator 50 to provide cooling.

After evaporation, the working fluid at point 52 contains acetone gas or vapor. The acetone gas or vapor then enters the cathode 44 side of the electrochemical device 40, where it recombines with hydrogen ions and electrons, and transforms into the hydrogenated form of the fluid pair, namely isopropanol. As discussed above, at point 30 the working fluid comprises isopropanol in the gas or vapor phase. As the working fluid continues to pass through the closed loop of the fluid conduit 22, it returns to the condenser 32, where it condenses into liquid isopropanol and begins the cycle again.

With reference to FIG. 2, the electrochemical device 40 is shown in more detail. The negative electrode/anode 42 and cathode 44 are separated by a separator membrane 64, which may be a porous solid polymeric separator membrane that is electrically insulating, but permits protons and/or other ions to pass there through (e.g., an ionomer). The anode 42 and cathode 44 may be porous structures that permit working fluid to flow there through. The anode 42 and cathode 44 may include very finely divided catalytic particles supported on internal and external surfaces of conductive carbon particles, and proton conductive material intermingled with the catalytic and carbon particles, by way of example. Each electrode (anode 42 and cathode 44) may include a respective current collector (not shown in the simplified depiction of electrochemical device 40) that is connected to a terminal or tab 60. Conductive tab 60 may be connected to an external circuit 62 through which electrons may flow when voltage is applied to the electrochemical device 40.

When voltage is applied to the system via the external power source 46, protons (W) 66 are transferred from the anode 42 (generated by the loss of hydrogen from the hydrogenated compound isopropanol being converted to the dehydrogenated compound acetone) through the separator membrane 64 to the cathode 44. Hydrogen is thus transformed into hydrogen ions (protons) and electrons. The electrons generated pass through the external circuit 62. Hydrogen protons travel through separator membrane 64 to the cathode 44 side by electrical field; while electrons travel to cathode 44 by the electrical power supply circuit. As can be seen in FIG. 2, isopropanol enters an anode inlet 70 of anode 42 and after the dehydrogenation reaction, exits an anode outlet 72 as acetone. Likewise, acetone enters a cathode inlet 74 of cathode 44 and after the hydrogenation reaction occurs on the cathode 44 side, exits a cathode outlet 76 of cathode 44 as isopropanol.

In this manner, utilizing a hydrogenation/dehydrogenation process reversibly transforms one organic substance into a second organic substance by employing an electrochemical device that creates a heat pump device, which may be an electrochemical refrigeration system. As recognized by those of skill in the art, circulation in the system and functionality of the various components may be modified to provide a reverse effect from cooling, for example, transferring heat where desired into a room or enclosed space, rather than removing heat from that room or enclosed space.

Figure 3:
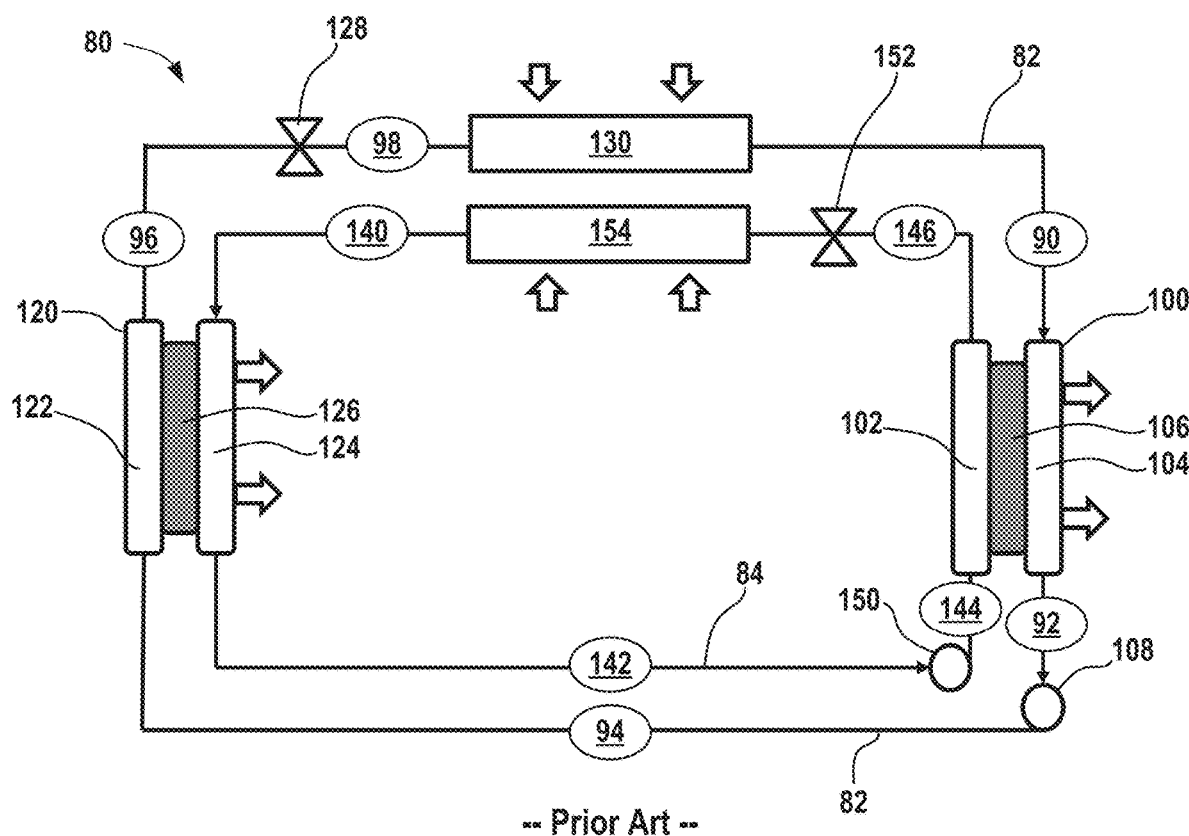
FIG. 3 shows another conventional electrochemical climate control system incorporating two electrochemical devices and using two distinct working fluid pairs of hydrogenated and dehydrogenated compounds without any condenser in the system.

In certain aspects, two distinct pairs of fluids may be used to achieve cooling in an electrochemical climate control system. Such a variation of a conventional electrochemical climate control system 80 is shown in FIG. 3. A first fluid flow path or first fluid conduit 82 establishes fluid communication between select components so that a first working fluid may circulate in a first loop as discussed further herein. The first working fluid may be a first pair of hydrogenated and dehydrogenated compounds, specifically a dehydrogenated compound, Compound A, and a hydrogenated compound, Compound B. As example of the first working fluid pair, Compound A may be acetone and Compound B may be isopropanol.

A second fluid flow path or second fluid conduit 84 establishes fluid communication between select components so that a second distinct working fluid may circulate in a second loop as discussed further herein. The second working fluid may have a second pair of hydrogenated and dehydrogenated compounds. More specifically, the second pair may include a dehydrogenated compound, Compound C, and a hydrogenated compound, Compound D. An example of the second fluid pair may be cyclohexanone ($(CH_2)_5CO$) as the dehydrogenated compound, while the hydrogenated compound is cyclohexanol ($(CH_2)_5CHOH$).

With respect to the first fluid conduit 82, at point 90, the working fluid comprises Compound A as a low pressure gas or vapor. Next, the working fluid having low pressure gas/vapor of Compound A passes into a first electrochemical device 100 having a negative electrode or anode 102, a positive electrode or cathode 104, and a separator 106. Compound A undergoes a hydrogenation reaction in the first electrochemical device 100 to convert to hydrogenated Compound B that exits at point 92. The first electrochemical device 100 expels heat from the electrochemical climate control system 80 during operation. While not shown, the first electrochemical device 100 may have various other components, including an external power source, described in the context of FIGS. 1 and 2. The working fluid comprising Compound B at point 92 is a liquid with a low pressure. The first working fluid travels through the first fluid conduit 82 and passes through a first pump 108, where the liquid is pressurized to become a high pressure liquid comprising Compound B at point 94.

The high pressure liquid phase working fluid comprising Compound B then enters a second electrochemical device 120 having a negative electrode or anode 122, a positive electrode or cathode 124, and a separator 126. Compound B undergoes a dehydrogenation reaction in the second electrochemical device 120 to convert to a dehydrogenated Compound A that exits the second electrochemical device 120 at point 96. The second electrochemical device 120 expels heat from the electrochemical climate control system 80 during operation. While not shown, the second electrochemical device 120, like first electrochemical device 100, may have various components, including an external power source, described in the context of FIGS. 1 and 2. The working fluid is a high pressure liquid comprising Compound A at point 96. Next, the working fluid in the first fluid conduit 82 passes through a first expansion device 128, where the working fluid is transformed from a high pressure liquid to a low pressure liquid comprising Compound A at point 98. Then, the working fluid enters a first heat exchanger or evaporator 130. Heat enters the system at the evaporator 130. The working liquid is thus vaporized to form a low pressure vapor or gas phase comprising Compound A at point 90, where it repeats the loop described above.

The second working fluid in the second fluid conduit 84 circulates in a countercurrent direction to the first working fluid in the first fluid conduit 82. At point 140, the working fluid comprises Compound C as a low pressure gas or vapor. The working fluid having low pressure gas/vapor of Compound C passes into the second electrochemical device 120 on a side opposite to the side that Compound B enters. The separator membrane can be selected to only permit protons to pass there through, thus working liquids having different compositions can be circulated through opposite sides of each electrochemical device. It should be noted, however, that in certain aspects, it may be desirable to avoid employing two distinct working fluids on opposite sides of the separator membrane can be advantageous to minimize any possible cross-contamination that may arise through the separator.

Compound C undergoes a hydrogenation reaction in the second electrochemical device 120 to convert to hydrogenated Compound D, which is shown exiting the second electrochemical device 120 at point 142. The working fluid at point 142 is a low pressure liquid comprising Compound D. The working fluid then passes through a second pump 150, where the low pressure liquid comprising Compound D is pressurized to become a high pressure liquid comprising Compound D at point 144. The high pressure liquid working fluid comprising Compound D then passes into the first electrochemical device 100 on a side opposite to the side that Compound A enters. Compound D undergoes a dehydrogenation reaction and exits the first electrochemical device 100 as Compound C. At point 146, the working fluid is a high pressure liquid comprising Compound C. It then passes into a second expansion device 152. After passing through the second expansion device 152, the working fluid is transformed from a high pressure liquid to a low pressure liquid comprising Compound C. Then, the working fluid enters a second heat exchanger or second evaporator 154. Heat also enters the system at the second evaporator 154. The working liquid is thus vaporized to form a low pressure vapor or gas phase comprising Compound C at point 140, where it repeats the cycle described above. It should be noted that in the system including two distinct electrochemical devices with two distinct working fluid conduits or loops, no condensers are present, because the working fluid can be transformed from a gas/vapor to a liquid without a condenser via changes in saturation temperature that occur after the hydrogenation/dehydrogenation reactions in the electrochemical cell. Furthermore, sufficient amounts of heat may be expelled from the system through one or more the electrochemical devices 100, 120.

Figure 4:
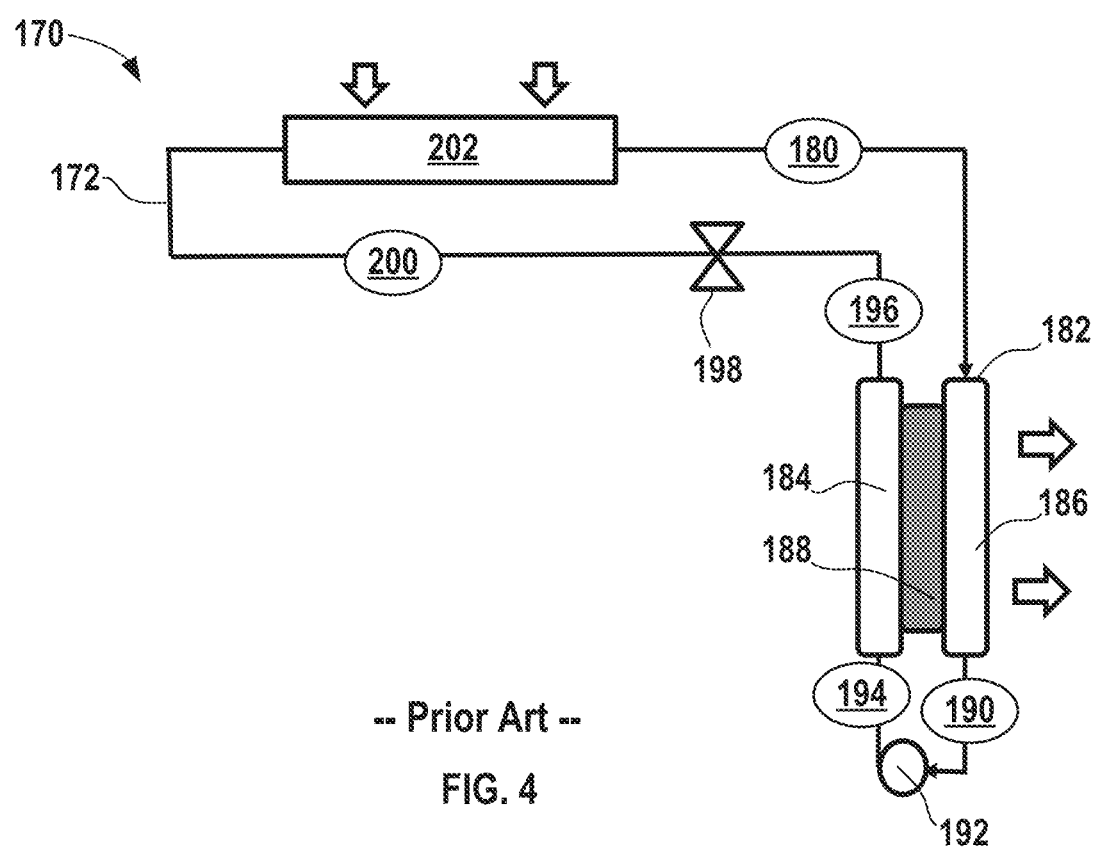
FIG. 4 shows another conventional electrochemical climate control system incorporating an electrochemical device having a single working fluid pair of a hydrogenated and dehydrogenated compound without any condenser in the system.

FIG. 4 shows a simplified schematic of yet another electrochemical climate control system 170 having a single working fluid with only a single pair of hydrogenated/dehydrogenated compounds, a single electrochemical device, and a single pump. A fluid flow path or fluid conduit 172 establishes fluid communication between select components so that the working fluid may circulate in the manner discussed herein. As described above, the working fluid may be a pair of hydrogenated and dehydrogenated compounds, specifically a dehydrogenated compound, Compound A, and a hydrogenated compound, Compound B. As example of the first working fluid pair, Compound A may be acetone and Compound B may be isopropanol.

At point 180, the working fluid comprises Compound A as a low pressure gas or vapor. Next, the working fluid having low pressure gas/vapor of Compound A passes into an electrochemical device 182 having a negative electrode or anode 184, a positive electrode or cathode 186, and a separator 188. More specifically, Compound A passes into a cathode 186 side of the electrochemical device 182 and undergoes a hydrogenation reaction in the electrochemical device 182 to convert to hydrogenated Compound B that exits at point 190. The working fluid comprising Compound B is a liquid that has a low pressure at this point. Notably, the electrochemical device 182 expels heat from the electrochemical climate control system 170 during operation. While not shown, the electrochemical device 182 may have various other components, including an external power source, described in the context of FIGS. 1 and 2. The first working fluid travels through a pump 192, where the liquid is pressurized to become a high pressure liquid comprising Compound B at point 194. No condenser is employed in system 170 to achieve this transformation to a high pressure liquid.

The high pressure, liquid phase, working fluid comprising Compound B then enters the anode 184 side of the electrochemical device 182. Compound B undergoes a dehydrogenation reaction in the electrochemical device 182 to convert to a dehydrogenated Compound A that exits at point 196. The working fluid is a high pressure liquid comprising Compound A at point 196. Next, the working fluid in the fluid conduit 172 passes through an expansion device 198, where the working fluid is transformed from a high pressure liquid to a low pressure liquid comprising Compound A at point 200. Then, the working fluid enters a heat exchanger or evaporator 202. Heat enters the system at the evaporator 202. The working liquid is thus vaporized to form a low pressure vapor or gas phase comprising Compound A at point 180, where it repeats the loop described above.

Figure 5:
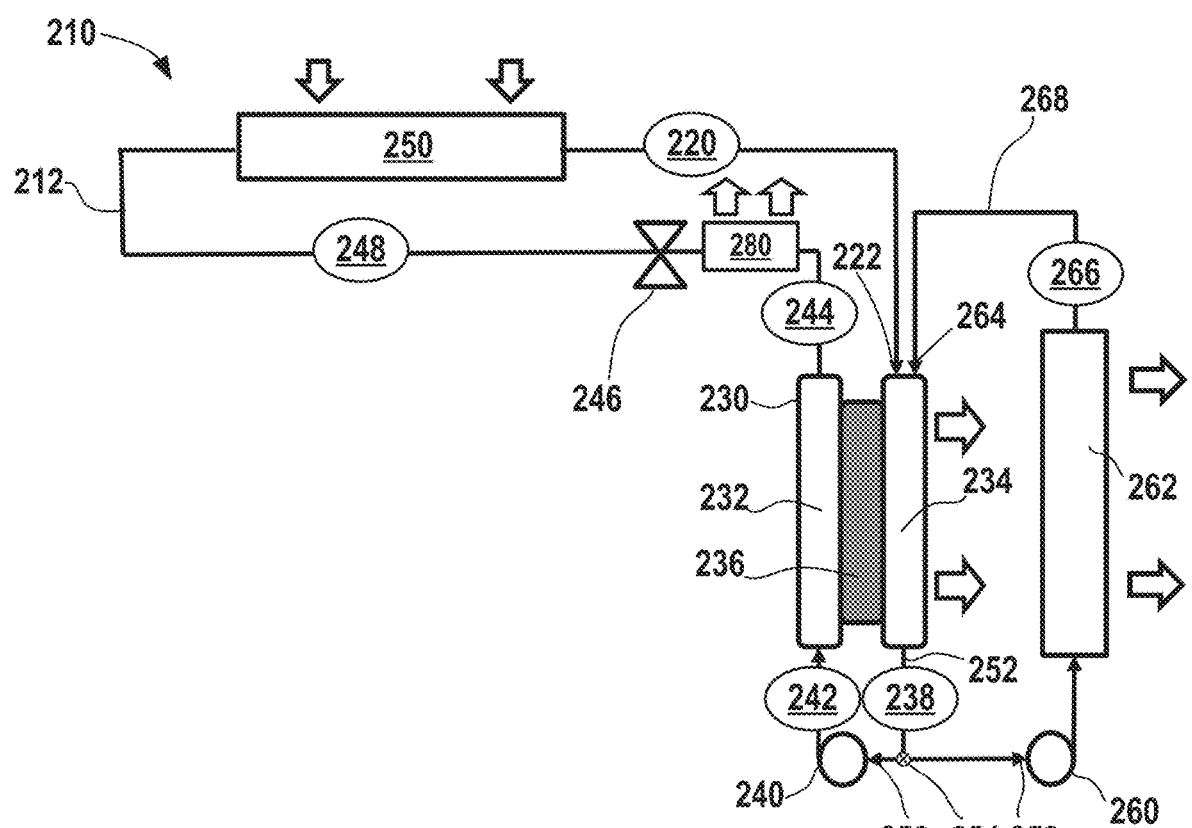
FIG. 5 shows an electrochemical climate control system prepared in accordance with certain aspects of the present disclosure incorporating an electrochemical device having a single working fluid pair of a hydrogenated and dehydrogenated compound without any condenser in the system, but further having a heat rejection system associated with the electrochemical device.

As discussed above, heat is expelled from the system via the electrochemical device 182 (and there are no condensers present), but an amount of heat removal from the electrochemical climate control system may not be sufficient for certain operating conditions and loads, for example, when a large amount of heat removal and cooling is necessary. In certain aspects, the polymeric separator membrane could potentially be vulnerable to degradation if high temperatures are reached within the electrochemical cell. Generally, it is desirable to avoid temperatures in excess of about 100° C. to avoid separator degradation. Thus, FIG. 5 shows a simplified schematic of another electrochemical climate control system 210 having a heat rejection system in accordance with certain aspects of the present disclosure to enhance heat removal and avoid potential issues associated with high temperatures inside the electrochemical cell. Like FIG. 4, climate control system 210 is shown with only a single working fluid having a single pair of hydrogenated/dehydrogenated compounds, a single electrochemical device, and a single pump, but as will be discussed further herein, such a heat removal system may also be used with multiple working fluids/multiple working fluid conduits and multiple electrochemical cells. A fluid flow path or fluid conduit 212 establishes fluid communication between select components so that the working fluid may circulate in the manner described herein. As described above, the working fluid may be a pair of hydrogenated and dehydrogenated compounds, specifically a dehydrogenated compound, Compound A, and a hydrogenated compound, Compound B. An example of the first single working fluid pair may include acetone as Compound A and isopropanol as Compound B.

At point 220, the working fluid comprises Compound A as a low pressure gas or vapor. Next, the working fluid having low pressure gas/vapor of Compound A passes into an electrochemical device 230 having a negative electrode or anode 232, a positive electrode or cathode 234, and a separator 236. More specifically, Compound A passes into a first inlet 222 of cathode 234 side of the electrochemical device 230 as a low pressure vapor/gas and undergoes a hydrogenation reaction in the electrochemical device 230 to convert to hydrogenated Compound B that exits at point 238 as a low pressure liquid. Notably, the electrochemical device 230 expels some heat from the electrochemical climate control system 210 during operation. While not shown, the electrochemical device 230 may have various other components, including an external power source, described in the context of FIG. 2. The first working fluid travels through a first pump 240, where the liquid is pressurized to become a high pressure liquid comprising Compound B at point 242.

No condenser is employed in system 210 to achieve this transformation to a high pressure liquid.

The high pressure liquid phase working fluid comprising Compound B then enters the anode 232 side of the electrochemical device 230. Compound B undergoes a dehydrogenation reaction in the electrochemical device 230 to convert to a dehydrogenated Compound A that exits at point 244. The working fluid is a high pressure liquid comprising Compound A at point 244. Next, the working fluid in the fluid conduit 212 passes through an expansion device 246, where the working fluid is transformed from a high pressure liquid to a low pressure liquid comprising Compound A at point 248. Then, the working fluid enters a heat exchanger or evaporator 250. Heat enters the system at the evaporator 250. The working liquid undergoes a phase change and is vaporized in the evaporator 250 to form a low pressure vapor or gas phase comprising Compound A at point 220, where it repeats the loop described above.

In accordance with various aspects of the present disclosure, the heat removal system in electrochemical climate control system 210 includes a recycle or recirculation loop configured to recycle or recirculate a portion of cooled working fluid back into a side of the electrochemical cell 230 where the vapor enters at first inlet 222 and where liquid exits on the opposite side at an outlet 252. As shown in FIG. 5, this is the cathode 234 side. At the outlet 252 of the cathode 234 side, there may be a flow regulator, such as a splitter or recirculation valve 254, for diverting a portion of the volume of working fluid exiting the outlet 252. Thus, the working fluid may travel in a first direction 256 towards the first pump 240 or in a second direction 258 towards a recirculation pump 260. The first pump 240 and the recirculation pump 260 may be adjusted to regulate flow, including the amount that flows in either the first direction 256 and/or the second direction 258, as appreciated by those of skill in the art.

The amount of working fluid flowing in the second direction 258, referred to herein as the portion of diverted working fluid comprising Compound B is a low pressure liquid that passes through the recirculation pump 260 into a second heat exchanger 262, for example, a radiator, for cooling the diverted working fluid. Then, the cooled portion of the diverted working fluid comprising Compound B exiting at point 266 can be returned and recirculated to a second inlet 264 of the cathode 234 side of the electrochemical device 230. The second heat exchanger 262 in the recirculation loop thus serves to cool a portion of the working fluid exiting the electrochemical device 230. By doing so, the electrochemical device 230 is being effectively cooled by introducing cooled liquid (the cooled working fluid passing through the second heat exchanger 262) and the power required to circulate the liquid is not substantial, because the amount needed is just enough to overcome the hydraulic resistance of the cooler/second heat exchanger 262 and recirculation loop piping 268. Notably, no phase changes occur in the second heat exchanger 262, rather the working fluid enters as a liquid (e.g., a low pressure liquid) and exits as a cooled liquid (e.g., a low pressure cooled liquid). Further, the working fluid itself is used as a coolant within the second heat exchanger 262 and thus, the system has a high thermal energy transfer efficiency and does not rely on a secondary coolant system loop for cooling the working fluid.

In certain aspects, a temperature of the working fluid entering the electrochemical device 230 during operation of electrochemical climate control system 210 is maintained at a temperature of less than or equal to about 100° C. to avoid any detrimental effects of high temperatures within the electrochemical cell. The heat rejected from the second heat exchanger 262 can be used for multiple further purposes. In one example, the heat may be used to heat other streams, such as water or some other media, for example, for a water heater.

In certain aspects, an amount of heat removed by the second heat exchanger 262 from the diverted portion of working fluid is expressed by a difference in temperature ($\Delta T$) between a first temperature ($T_1$) of the working fluid at point 238 and a second temperature ($T_2$) of the working fluid at point 266. The amount of heat removal may be regulated by controlling a volumetric flow rate of the diverted portion of working fluid passing the second direction 258 through the recirculation pump 260 and by a specific design of the second heat exchanger 262, air flow (where the fan is not shown) or water flow (where the pump is not shown) through the second heat exchanger 262. In one variation, the second heat exchanger 262 may be a radiator where working fluid/liquid to be cooled passes through exposed pipes or fins. Air or another coolant media (such as water) can be used to pass across an opposite side of the exposed pipes or fins for heat exchange and cooling of the working fluid/liquid. However, other types of heat exchangers are also contemplated for use as the second heat exchanger 262. The amount of cooling required by the heat rejection system in electrochemical climate control system 210 may depend upon operating conditions, including the cooling and/or load requirements. In certain variations, a difference between the first temperature ($T_1$) at point 238 and the second temperature ($T_2$) at point 266 may be greater than or equal to about 5° C. (where the second temperature $T_2$ is at least about 5° C. below the first temperature $T_1$), optionally greater than or equal to about 10° C., optionally greater than or equal to about 15° C., optionally greater than or equal to about 18° C., optionally greater than or equal to about 20° C., optionally greater than or equal to about 30° C., optionally greater than or equal to about 40° C., optionally greater than or equal to about 50° C., optionally greater than or equal to about 60° C., optionally greater than or equal to about 70° C., optionally greater than or equal to about 80° C., optionally greater than or equal to about 90° C., and in certain variations, optionally greater than or equal to about 100° C.

In certain other variations, a percentage of recirculation can be calculated as a volumetric flow rate (or alternatively mass flow rate) of the diverted portion of working fluid passing in second direction 258 towards the second heat exchanger 262 over a total initial volumetric flow rate (or alternatively initial mass flow rate) of working fluid exiting the electrochemical device 230 at outlet 252 of the cathode 234 side ($Q_{total}$), expressed as $$\% \text{ recirculation} = \frac{Q_{recirc}}{Q_{total}}.$$

In certain aspects, a percentage of recirculation may range from greater than or equal to about 2% to less than or equal to about 90%. In certain aspects, a percentage of recirculation may be greater than or equal to about 3%, optionally greater than or equal to about 4%, optionally greater than or equal to about 5%, optionally greater than or equal to about 10%, optionally greater than or equal to about 15%, optionally greater than or equal to about 20%, optionally greater than or equal to about 25%, optionally greater than or equal to about 30%, optionally greater than or equal to about 35%, optionally greater than or equal to about 40%, optionally greater than or equal to about 45%, optionally greater than or equal to about 50%, optionally greater than or equal to about 55%, optionally greater than or equal to about 60%, optionally greater than or equal to about 65%, optionally greater than or equal to about 70%, optionally greater than or equal to about 75%, optionally greater than or equal to about 80%, and in certain variations, optionally greater than or equal to about 85%. As will be appreciated by those of skill in the art, as the amount of recirculated and cooled liquid working fluid comprising Compound B is introduced into the cathode 234 side, less working fluid vapor comprising Compound A is introduced into the electrochemical device 230 and available to react. Thus, while balancing the amount of cooling/heat removal necessary in terms of a percentage or amount recirculated, it may be desirable to avoid introducing excessive amounts of recirculated cooled working fluid comprising Compound B that might diminish the amount of Compound A introduced into the electrode for reaction. Thus, in certain aspects, an amount of cooled/recirculated working fluid is kept to less than about 90% by volume to ensure that an adequate amount of the reactant (Compound A) is introduced into the electrochemical cell 230.

In certain other aspects, compound A passing into a first inlet 222 of cathode 234 side of the electrochemical device 230 as a low pressure vapor/gas and cooled liquid Compound B being recirculated into the second inlet 264 of the cathode 234 side can be blended or mixed prior to being introduced into the cathode 234. In certain aspects, the mixture of Compound A and Compound B may be substantially homogenous. In certain variations, instead of having two distinct inlets (first inlet 222 and second inlet 264) there may be a mixing component or mixing chamber (not shown) that leads to a single inlet into the cathode 234 of the electrochemical device 230. As the majority of heat generation takes place on the cathode 234 side in the electrochemical device 230, this is the primary focus for the heat exchange in the design shown in FIG. 5.

It should be noted that cooled liquid is desirably recirculated on a side of the electrochemical cell where gas is transformed into liquid, but does not necessarily have to be introduced into a cathode side (depending on the fluid compositions selected and reactions that occur within the electrochemical cell compressor). Thus, in certain alternative aspects, a heat removal system may be employed with the opposite side of the electrochemical device, in this instance, by delivering recirculated and cooled working fluid into the anode side of an electrochemical device, so long as the cooled liquid is delivered onto the side of the electrochemical cell where a gas is transformed to a liquid. A cooler 280 can be installed downstream of the point 244 (where working fluid is a high pressure liquid comprising Compound A) before expansion valve 246. The heat can be removed by heat exchange with air or water (not shown).

In one example a thermal energy balance for an exemplary electrochemical climate control system including an electrochemical compressor is provided. During electrochemical reaction on the cathode side, an amount of heat generated can be assumed around 200 kJ/kg. Specific heat of the liquid product, generated on the cathode, can be assumed to be around 2.7 kJ/kg Therefore, if it is assumed that all the heat generated on the cathode side will be removed by reaction product recirculation, then, if the reaction product recirculation rate is, for example, 4 times of the actual reaction rate, a desired temperature drop for heat removal would be around 18° C. As such, in order to perform the described chemical reaction and further separate the product (liquid) from incoming substance (gas), an operational temperature at the cathode is desirably controlled, so that it is low enough to achieve a liquid state of the reaction product at the pressure of incoming substance (gas), because otherwise separation between incoming gas and a product of reaction becomes difficult. To control an amount of heat exchange occurring within the second heat exchanger 262, an outlet temperature (e.g., the second temperature ($T_2$) of the working fluid at point 266) or liquid temperature of the working fluid within the second heat exchanger 262 can be used to regulate flow rates through the second heat exchanger 262 and thus control an amount of cooling that occurs. By including a heat rejection system associated with the electrochemical device within the electrochemical climate control system, it is possible to increase an overall capacity of the system and to increase the size of the electrochemical device, making it a more feasible and efficient option for use in practical commercial, industrial, and residential climate control systems.

FIG. 6 shows a simplified schematic of another electrochemical climate control system 300 employing two distinct pairs of working fluids and having a heat rejection system to enhance heat removal and avoid potential issues associated with high temperatures inside the electrochemical cell. A first fluid flow path or first fluid conduit 302 establishes fluid communication between select components so that a first working fluid may circulate in a first loop as discussed further herein. The first working fluid may be a first pair of hydrogenated and dehydrogenated compounds, specifically a dehydrogenated compound, Compound A, and a hydrogenated compound, Compound B. As example of the first working fluid pair, Compound A may be acetone and Compound B may be isopropanol.

A second fluid flow path or second fluid conduit 304 establishes fluid communication between select components so that a second distinct working fluid may circulate in a second loop as discussed further herein. The second working fluid may have a second pair of hydrogenated and dehydrogenated compounds. More specifically, the second pair may include a dehydrogenated compound, Compound C, and a hydrogenated compound, Compound D. An example of the second working fluid pair may be cyclohexanone (($CH_2$)$_5$CO) as the dehydrogenated compound, while the cyclohexanol (($CH_2$)$_5$CHOH) as the hydrogenated compound.

With respect to the first fluid conduit 302, at point 310, the working fluid comprises Compound A as a low pressure gas or vapor. Next, the working fluid having low pressure gas/vapor of Compound A passes into a first electrochemical device 320 having a negative electrode or anode 322, a positive electrode or cathode 324, and a separator 326. Compound A undergoes a hydrogenation reaction in the first electrochemical device 320 to convert to hydrogenated Compound B that exits at point 312. The first electrochemical device 320 can expel heat from the electrochemical climate control system 300 during operation. While not shown, the first electrochemical device 320 may have various other components, including an external power source, described in the context of FIGS. 1 and 2. The working fluid comprising Compound B at point 312 is a liquid with a low pressure. The first working fluid travels through the first fluid conduit 302 and passes through a first pump 330, where the liquid is pressurized to become a high pressure liquid comprising Compound B at point 314.

The high pressure liquid phase working fluid comprising Compound B then enters a second electrochemical device 340 having a negative electrode or anode 342, a positive electrode or cathode 344, and a separator 346. Compound B undergoes a dehydrogenation reaction in the second electrochemical device 340 to convert to a dehydrogenated Compound A that exits the second electrochemical device 340 at point 316. The second electrochemical device 340 can also expel heat from the electrochemical climate control system 300 during operation. While not shown, the second electrochemical device 340 may also have various components, including an external power source, described in the context of FIGS. 1 and 2. The working fluid is a high pressure liquid comprising Compound A at point 316. Next, the working fluid in the first fluid conduit 302 passes through a first expansion device 348, where the working fluid is transformed from a high pressure liquid to a low pressure liquid comprising Compound A. Then, the working fluid enters a first heat exchanger or evaporator 350. Heat enters the system at the evaporator 350. The working liquid is thus vaporized to form a low pressure vapor or gas phase comprising Compound A at point 310, where it repeats the loop described above.

The second working fluid in the second fluid conduit 304 circulates in a countercurrent direction to the first working fluid in the first fluid conduit 302. At point 360, the working fluid comprises Compound C as a low pressure gas or vapor. The working fluid having low pressure gas/vapor of Compound C passes into the second electrochemical device 340 on a side opposite to the side that Compound B enters (namely the cathode 344 side). The separator membrane 346 can be selected to permit only protons to pass there through, thus working liquids having different compositions can be circulated through opposite sides of each electrochemical cell.

Compound C undergoes a hydrogenation reaction in the second electrochemical device 340 to convert to hydrogenated Compound D, which is shown exiting the second electrochemical device 340 at point 362. The working fluid at point 362 is a low pressure liquid comprising Compound D. The working fluid then passes through a second pump 370, where the low pressure liquid comprising Compound D is pressurized to become a high pressure liquid comprising Compound D at point 364. The high pressure liquid working fluid comprising Compound D then passes into the first electrochemical device 320 on a side opposite to the side that Compound A enters (on the anode side 322). Compound D undergoes a dehydrogenation reaction and exits the first electrochemical device 320 as Compound C. At point 366, the working fluid is a high pressure liquid comprising Compound C. It then passes into a second expansion device 372. After passing through the second expansion device 372, the working fluid is transformed from a high pressure liquid to a low pressure liquid comprising Compound C. Then, the working fluid enters a second heat exchanger or second evaporator 374. Heat also enters the system at the second evaporator 374. The working liquid is thus vaporized to form a low pressure vapor or gas phase comprising Compound C at point 360, where it repeats the cycle described above. It should be noted that in the system including two distinct electrochemical devices with two distinct working fluid conduits or loops, no condensers are present, because the working fluid can be transformed to a liquid without a condenser via changes in saturation temperature that occur after the hydrogenation/dehydrogenation reactions in the electrochemical cell.

In certain aspects, the heat removal system in electrochemical climate control system 300 can be similar to that described in the context of FIG. 5 and includes dual recirculation systems that are configured to recirculate or recycle a portion of working fluid back into the first electrochemical device 320 or the second electrochemical device 340. For example, in the first electrochemical device 320, gas or vapor enters at a first inlet 376 and liquid exits on the opposite side at a first outlet 378. A diverted or recycled portion of the working fluid thus enters first the electrochemical device 320 on the cathode 324 side. At the first outlet 378 of the cathode 324 side, there may be a flow regulator, such as a first splitter or first recirculation valve 380, for diverting a portion of the working fluid exiting the first outlet 378. Thus, the working fluid may travel in a first direction 382 towards the first pump 330 or in a second direction 384 towards a first recirculation pump 386. The first pump 330 and the first recirculation pump 386 may be adjusted to regulate flow, including the amount that flows in the first direction 382 and the second direction 384, as appreciated by those of skill in the art.

The amount flowing in the second direction 384, referred to herein as the portion of diverted working fluid comprising Compound B as a low pressure liquid passes through the first recirculation pump 386 into a first recirculation loop 388 that includes a third heat exchanger 390 or radiator for cooling the diverted working fluid. Then, the cooled portion of the working fluid comprising Compound B exiting at point 392 can be returned and recirculated to a second inlet 394 of the cathode side 324 of the electrochemical device 320. The third heat exchanger 390 in the first recirculation loop 388 thus serves to cool a portion of the working fluid exiting the first electrochemical device 320. By doing so, the first electrochemical device 320 is effectively being cooled by cooling the liquid as it enters (the cooled working fluid passing through the third heat exchanger 390) and the power required to circulate the liquid is not substantial, because the amount needed is just enough to overcome the hydraulic resistance of the cooler/third heat exchanger 390 and first recirculation loop 388 piping. Notably, no phase changes occur in the third heat exchanger 390, rather the working fluid enters as a liquid (e.g., a low pressure liquid) and exits as a cooled liquid (e.g., a low pressure cooled liquid). In certain aspects, a temperature of the working fluid entering the first electrochemical device 320 during operation of electrochemical climate control system 300 is maintained at a temperature of less than or equal to about 100° C. to avoid any detrimental effects of high temperatures within the electrochemical device. The amount of heat rejected from the third heat exchanger 390 can be similar to that described in the context of the second heat exchanger 262 in FIG. 5. The heat rejected can be used for multiple further purposes, as discussed above, such as to heat other streams, like water or other cooling media. The third heat exchanger 390 may be a radiator in certain variations.

The electrochemical climate control system 300 also includes a second recirculation loop 400 configured to recirculate or recycle a portion of working fluid back into the second electrochemical device 340. For example, in the second electrochemical device 340, vapor enters at a third inlet 402 and liquid exits on the opposite side at a second outlet 404. The diverted or recycled portion of the working fluid thus enters the second electrochemical device 340 on the cathode 344 side. At the second outlet 404 of the cathode 344 side, there may be a flow regulator, such as a second splitter or second recirculation valve 410, for diverting a portion of the working fluid exiting the second outlet 404. Thus, the working fluid may travel in a first direction 412 towards the second pump 370 or in a second direction 414 towards a second recirculation pump 416. The second pump 370 and the second recirculation pump 416 may be adjusted to regulate flow, including the amount that flows in the first direction 412 and the second direction 414, as appreciated by those of skill in the art.

The amount flowing in the second direction 414, referred to herein as the portion of diverted second working fluid comprising Compound D as a low pressure liquid passes through the second recirculation pump 416 into the second recirculation loop 400. The second recirculation loop 400 includes a fourth heat exchanger 420 or radiator for cooling the diverted second working fluid. Then, the cooled portion of the second working fluid comprising Compound D exiting at point 422 can be returned and recirculated to a fourth inlet 424 of the cathode 344 side of the second electrochemical device 340. The fourth heat exchanger 420 in the second recirculation loop 400 thus serves to cool a portion of the second working fluid exiting the second electrochemical device 340. By doing so, the second electrochemical device 340 is effectively cooled by the cooled liquid as it enters the second electrochemical device 340 (the cooled working fluid passing through the fourth heat exchanger 420) and the power required to circulate the liquid is not substantial, because the amount needed is just enough to overcome the hydraulic resistance of the cooler/fourth heat exchanger 420 and second recirculation loop 400 piping. Notably, no phase changes occur in the fourth heat exchanger 420, rather the working fluid enters as a liquid (e.g., a low pressure liquid) and exits as a cooled liquid (e.g., a low pressure cooled liquid). In certain aspects, a temperature of the working fluid entering the second electrochemical device 340 during operation of electrochemical climate control system 300 is maintained at a temperature of less than or equal to about 100° C. to avoid any detrimental effects of high temperatures within the electrochemical device. The amount of heat rejected from the fourth heat exchanger 420 can be similar to that described in the context of the second heat exchanger 262 in FIG. 5. The heat rejected from the fourth heat exchanger 420 can be used for multiple further purposes, as discussed above. The fourth heat exchanger 420 may be a radiator in certain variations, although other types of heat exchangers are also contemplated.

In certain other aspects, Compound A passing into a first inlet 376 of cathode side 324 of the first electrochemical device 320 as a low pressure vapor/gas and cooled liquid Compound B being recirculated into the second inlet 394 of the cathode side 324 can be blended or mixed prior to being introduced into the cathode 324, as discussed previously in the context of FIG. 5. Likewise, in other aspects, Compound C passing into the third inlet 402 of cathode 344 side of the second electrochemical device 340 as a low pressure vapor/gas and cooled liquid Compound D being recirculated into the fourth inlet 424 of the cathode 344 side can be blended or mixed prior to being introduced into the cathode 344 of the second electrochemical device 340.

In certain aspects, the mixture of Compound A and Compound B or the mixture of Compound C and Compound D may respectively be substantially homogenous. In certain variations, instead of having two distinct inlets (first inlet 376 and second inlet 394 and/or third inlet 402 and fourth inlet 424) there may be a mixing component or mixing chamber (not shown) that leads to a single inlet into the cathode 324 of the first electrochemical device 320 or the cathode 344 of the second electrochemical device 340.

In certain aspects, the present disclosure contemplates a climate control system comprising an electrochemical device, a first heat exchanger configured to operate as an evaporator and disposed upstream of the electrochemical device, an expansion device disposed between the electrochemical device and the first heat exchanger, a first pump, and a fluid conduit for establishing fluid communication between the electrochemical device, the first heat exchanger, the expansion device, and the pump. The first pump circulates the working fluid in the fluid conduit. The working fluid has a composition that undergoes a reversible hydrogenation and dehydrogenation reaction when it passes through the electrochemical device when a potential is applied thereto. A second heat exchanger configured to cool a portion of the working fluid exiting the electrochemical device. A recirculation pump circulates the portion of the working fluid exiting the electrochemical device through the second heat exchanger and back to an inlet of the electrochemical device.

In certain aspects, the electrochemical device comprises a positive electrode, a negative electrode, a separator, and a first outlet. The inlet is a first inlet and the electrochemical device further comprises a second inlet. The working fluid exiting the expansion device in a gas or vapor phase enters the positive electrode in the electrochemical device via the second inlet and the portion of the working fluid cooled in the second heat exchanger is in a liquid phase and enters the positive electrode in the electrochemical device via the first inlet.

In certain aspects, a temperature of the working fluid is reduced by greater than or equal to about 5° C. after exiting the second heat exchanger as compared to an inlet temperature into the second heat exchanger.

In certain other aspects, a temperature of the working fluid is reduced by greater than or equal to about 5° C. after exiting the second heat exchanger as compared to an inlet temperature into the second heat exchanger.

In certain aspects, a temperature of the working fluid entering the electrochemical device is maintained at a temperature of less than or equal to about 100° C.

In other aspects, a percentage of recirculation of the portion of the working fluid is greater than or equal to about 2% and less than or equal to about 90% by volume of a total volume of the working fluid entering the electrochemical device.

In certain other aspects, the climate control system is free of a condenser.

In certain aspects, the composition comprises acetone in a dehydrogenated form and isopropanol in a hydrogenated form.

In certain other aspects, the present disclosure contemplates a climate control system comprising a first fluid conduit for establishing fluid communication between a first electrochemical device, a first heat exchanger configured to operate as an evaporator and disposed upstream of the first electrochemical device, a first expansion device disposed between the first electrochemical device and the first heat exchanger, and a first pump. The first pump circulates a first working fluid in the first fluid conduit. The first working fluid comprises a first pair of compounds that undergoes a reversible hydrogenation and dehydrogenation reaction in the first electrochemical device when a potential is applied thereto. The climate control system also comprises a first recirculation pump that circulates a portion of the first working fluid exiting the electrochemical device through a second heat exchanger and back to a first inlet of the first electrochemical device. The climate control system further includes a second fluid conduit for establishing fluid communication between a second electrochemical device, a third heat exchanger configured to operate as an evaporator and disposed upstream of the second electrochemical device, a second expansion device disposed between the second electrochemical device and the third heat exchanger, and a second pump. The second pump circulates a second working fluid in the second fluid conduit. The second working fluid comprises a second pair of compounds that undergoes a reversible hydrogenation and dehydrogenation reaction in the second electrochemical device when a potential is applied thereto. A second recirculation pump is also included that circulates the portion of the second working fluid exiting the second electrochemical device through a fourth heat exchanger and back to a second inlet of the second electrochemical device.

In certain aspects, the first electrochemical device comprises a first positive electrode, a first negative electrode, a first separator, and a first outlet, and a third inlet. The working fluid exiting the first expansion device in a gas or vapor phase enters the first positive electrode in the first electrochemical device via the third inlet and the portion of the working fluid cooled in the second heat exchanger is in a liquid phase and enters the first positive electrode in the first electrochemical device via the first inlet. The second electrochemical device comprises a second positive electrode, a second negative electrode, a second separator, a second outlet, and a fourth inlet. The working fluid exiting the second expansion device in a gas or vapor phase enters the second positive electrode in the second electrochemical device via the fourth inlet and the portion of the working fluid cooled in the fourth heat exchanger is in a liquid phase and enters the second positive electrode in the second electrochemical device via the second inlet.

In certain aspects, the first pair of compounds comprises a first hydrogenated compound comprising isopropanol and a second dehydrogenated compound comprising acetone. The second pair of compounds comprises a third hydrogenated compound comprising cyclohexanol and a fourth dehydrogenated compound comprising cyclohexanone.

In certain other aspects, the climate control system is free of a condenser.

In certain aspects, a percentage of recirculation of the portion of the first working fluid is greater than or equal to about 2% and less than or equal to about 90% by volume of a total volume of the first working fluid entering the first electrochemical device. Further, a percentage of recirculation of the portion of the second working fluid is greater than or equal to about 2% and less than or equal to about 90% by volume of a total volume of the second working fluid entering the second electrochemical device.

In yet other aspects, the present disclosure provides a method for rejecting heat from an electrochemical climate control system comprising circulating a working fluid in a fluid conduit comprising a first pump for pumping the working fluid, a first heat exchanger configured to operate as an evaporator and disposed upstream of the first electrochemical device, and a first expansion device disposed between the first electrochemical device and the first heat exchanger. The working fluid comprises a composition that undergoes a reversible hydrogenation and dehydrogenation reaction when it passes through the electrochemical device when a potential is applied thereto. The method also comprises circulating a portion of the working fluid exiting the electrochemical device into a recirculation loop that comprises a second heat exchanger configured to cool a portion of the working fluid. A temperature of the working fluid in the electrochemical device is maintained at less than or equal to about 100° C.

In certain aspects, the working fluid comprises a pair of a first hydrogenated compound and a second dehydrogenated compound that undergoes a reversible hydrogenation and dehydrogenation reaction in the first electrochemical device when a potential is applied thereto.

In certain aspects, the first hydrogenated compound comprises isopropanol and the second dehydrogenated compound comprises acetone.

In other aspects, the recirculation loop further comprises a recirculation pump that circulates the portion of the working fluid exiting the electrochemical device through the second heat exchanger and back to an inlet of the electrochemical device.

In certain aspects, a temperature of the working fluid is reduced by greater than or equal to about 5° C. after exiting the second heat exchanger as compared to an inlet temperature into the second heat exchanger, optionally by greater than or equal to about 10° C.

In other aspects, a temperature of the working fluid is reduced by greater than or equal to about 15° C. after exiting the second heat exchanger as compared to an inlet temperature into the second heat exchanger, optionally reduced by greater than or equal to about 18° C.

In certain other aspects, a percentage of recirculation of the portion of the working fluid is greater than or equal to about 2% and less than or equal to about 90% by volume of a total volume of the working fluid entering the electrochemical device.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate control system comprising:
   an electrochemical device;
   a first heat exchanger configured to operate as an evaporator and disposed upstream of the electrochemical device;
   an expansion device disposed between the electrochemical device and the first heat exchanger;
   a first pump;
   a fluid conduit for establishing fluid communication between the electrochemical device, the first heat exchanger, the expansion device, and the first pump, so that the first pump circulates a working fluid in the fluid conduit, wherein the working fluid has a composition that undergoes a reversible hydrogenation and dehydrogenation reaction when it passes through the electrochemical device when a potential is applied thereto; and
   a heat rejection system configured to cool a portion of the working fluid exiting the electrochemical device for heat rejection from the electrochemical device.

2. The climate control system of claim 1, wherein the electrochemical device comprises a positive electrode, a negative electrode, a separator, and a first outlet, wherein the inlet is a first inlet and the electrochemical device further comprises a second inlet, wherein the working fluid exiting the expansion device in a gas or vapor phase enters the positive electrode in the electrochemical device via the second inlet and a portion of the working fluid cooled in the heat rejection system is in a liquid phase and enters the positive electrode in the electrochemical device via the first inlet.

3. The climate control system of claim 1, wherein a temperature of the working fluid is reduced by greater than or equal to about 5° C. after exiting the heat rejection system as compared to an inlet temperature into the heat rejection system.

4. The climate control system of claim 1, wherein a temperature of the working fluid is reduced by greater than or equal to about 18° C. after exiting the heat rejection system as compared to an inlet temperature into the heat rejection system.

5. The climate control system of claim 1, wherein a temperature of the working fluid entering the electrochemical device is maintained at a temperature of less than or equal to about 100° C.

6. The climate control system of claim 1, wherein a percentage of recirculation of the portion of the working fluid in the heat rejection system is greater than or equal to about 2% and less than or equal to about 90% by volume of a total volume of the working fluid entering the electrochemical device.

7. The climate control system of claim 1, wherein composition comprises acetone in a dehydrogenated form and isopropanol in a hydrogenated form.

8. A method for rejecting heat from an electrochemical climate control system comprising:
circulating a working fluid in a fluid conduit that comprises a first heat exchanger configured to operate as an evaporator disposed upstream of an electrochemical device, and an expansion device disposed between the electrochemical device and the first heat exchanger, wherein the working fluid comprises a composition that undergoes a reversible hydrogenation and dehydrogenation reaction when it passes through the electrochemical device when a potential is applied thereto; and
circulating a portion of the working fluid exiting the electrochemical device into a heat rejection system comprising a recirculation loop that cools a portion of the working fluid and rejects heat from the electrochemical device.

9. The method of claim 8, wherein the working fluid comprises a pair of a first hydrogenated compound and a second dehydrogenated compound that undergoes a reversible hydrogenation and dehydrogenation reaction in the electrochemical device when a potential is applied thereto.

10. The method of claim 9, wherein the first hydrogenated compound comprises isopropanol and the second dehydrogenated compound comprises acetone.

11. The method of claim 8, wherein the heat rejection system comprises a second heat exchanger and the method further comprises circulating the portion of the working fluid exiting the electrochemical device through a second heat exchanger in the heat rejection system and back to an inlet of the electrochemical device.

12. The method of claim 8, wherein a temperature of the working fluid is reduced by greater than or equal to about 5° C. after exiting the heat rejection system as compared to an inlet temperature into the heat rejection system.

13. The method of claim 8, wherein a temperature of the working fluid is reduced by greater than or equal to about 18° C. after exiting the heat rejection system in the heat rejection system as compared to an inlet temperature into the heat rejection system.

14. The method of claim 8, wherein a percentage of recirculation of the portion of the working fluid is greater than or equal to about 2% and less than or equal to about 90% by volume of a total volume of the working fluid entering the electrochemical device.

* * * * *